March 4, 1958  R. C. DU BOIS  2,825,354

PILOT VALVE

Filed March 16, 1954

INVENTOR.
Robert Clark Du Bois
BY Arthur H. Swanson
ATTORNEY.

United States Patent Office 2,825,354
Patented Mar. 4, 1958

2,825,354

PILOT VALVE

Robert Clark Du Bois, Fairfield, Conn., assignor to Minneapolis-Honeywell Regulator Company, Minneapolis, Minn., a corporation of Delaware Application March 16, 1954, Serial No. 416,453

8 Claims. (Cl. 137—85)

The general object of the present invention is to provide an improved pilot valve suitable for use in a pneumatic balance system.

A more specific object of the present invention is to provide a new and improved pilot valve which is characterized by its use of a single diaphragm unit and a double acting valve member to achieve accurate reproduction of a control pressure.

The present invention is to provide a pilot valve which includes a feedback and pressure transmitting chamber, a regulable inlet for fluid under pressure and a control or nozzle pressure chamber separated from the first mentioned chamber by a flexible diaphragm. Also included is a flexible exhaust conduit within one of said chambers operative to reduce the pressure in the feedback chamber following an increase in the pressure in that chamber relative to the pressure in said nozzle chamber.

The invention is thus adapted for use in pneumatic balance systems heretofore including two diaphragms, such for example, as the systems shown in the Moore Patent 2,125,081 of July 26, 1953, and in the Johnson Patent 2,618,286 of November 18, 1952.

The use in the present invention of a single diaphragm, the double acting valve, and the cooperating flexible exhaust conduit permits a much simplified form of pneumatic relay thus enhancing its ease of manufacture and making the relay comparatively inexpensive without any accompanying loss of sensitivity or accuracy.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

In the drawings.

Unless otherwise noted corresponding components shown in the various figures carry corresponding reference characters.

Figure 1:
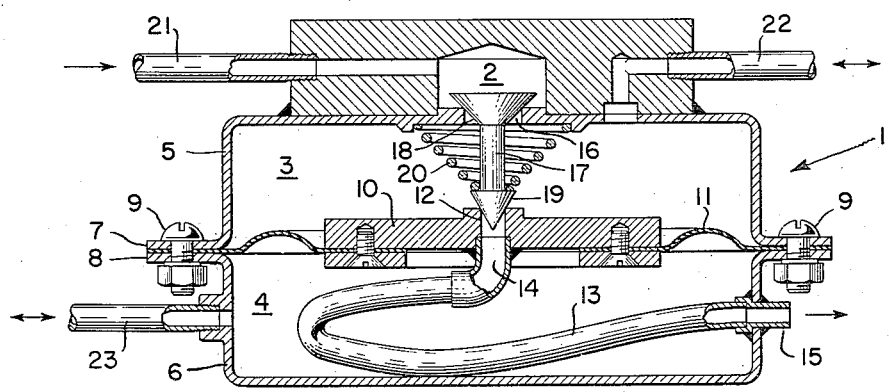
Fig. 1 is a sectional elevation of a pilot valve.

Fig. 1 illustrates a chambered pilot valve casing structure 1 which encloses a supply chamber 2, a feedback and pressure transmitting chamber 3, and a control or pressure chamber 4 which regulates the pressure in the chamber 3. As a matter of convenience, it is assumed in the description of the structure 1 shown in Figs. 1 and 3, that the feedback and transmitting chamber 3 is beneath the supply chamber 2 and above the nozzle pressure chamber 4. In fact, however, the general operation of the pilot valve shown in Fig. 1 is independent of the spatial position of the pilot valve structure. As shown, the casing structure comprises two rigid cup-shaped sections 5 and 6 with outwardly extending peripheral flanges 7 and 8 at their adjacent open ends. The flanges 7 and 8 are secured in abutting relation by clamping bolts 9.

The feedback and transmitting chamber 3 and nozzle pressure chamber 4 are separated by a diaphragm which in the preferred form shown in Fig. 1, comprises a rigid central portion 10 and a surrounding flexible, non-elastic, annular portion 11 which has an inner edge portion clamped against an outer portion of the diaphragm part 10. The peripheral or outer edge of the annular diaphragm portion 11 is clamped between the casing flanges 7 and 8 by the bolts 9. The diaphragm section 11 may advantageously be made of leather, rubber or plastic material which is flexible and has no significant elasticity. The diaphragm may also be made of thin flexible metal corrugated so as to make its resistance to the transverse movement of the central portion of the diaphragm quite small.

The rigid central portion 10 of the diaphragm is formed with a transverse central port 12. The lower end of the port 12 receives an upper end portion 14 of a flexible, substantially non-elastic, exhaust tube 13 which has its outer end 15 extending through and anchored in an opening in the annular body portion of the casing member 6. The upper end wall of the casing section 5 is formed with a central port 16 in alignment with the port 12. The flow of air under pressure into the chamber 3 through the port 16 and the flow of air out of the chamber 3 through the port 12 and tube 13, are each regulated by valve means 17. As shown, the valve means 17 comprises a stem portion connecting upper and lower plug valve sections 18 and 19, shown as tapered and having their larger upper ends of larger diameter than the stem portion. The valve member 17 is biased by a spring 20 for movement in the direction in which its valve portions 18 and 19 close the ports 16 and 12, respectively. Although not shown in the drawing, it may be desirable in some uses of this pilot valve to retain this valve member 17 in a partially opened position rather than in the closed position shown. As shown in Fig. 1, the spring 20 is in the form of a tapered helix with its larger upper end engaging the top wall of the member 5 and its lower end engaging the upper end portion of the valve member 19. Although not shown in the drawing, any standard screw actuated cap means may be used to alter the spring bias on the valve 17 if such is desired.

Air at a constant supply pressure, which may well be 20 p. s. i., is supplied to the chamber 2 through a supply pipe 21. The pressure in the chamber 3 is transmitted to a bellows chamber 26 or other control element by a pipe 22. Such other control apparatus might well be the head of a control valve as disclosed in the previously mentioned Johnson Patent 2,618,286. A pipe 23 may transmit the pressure to chamber 4 from a bleed nozzle 25 such as is shown in Fig. 3 or from some other analogous control element.

Figure 3:
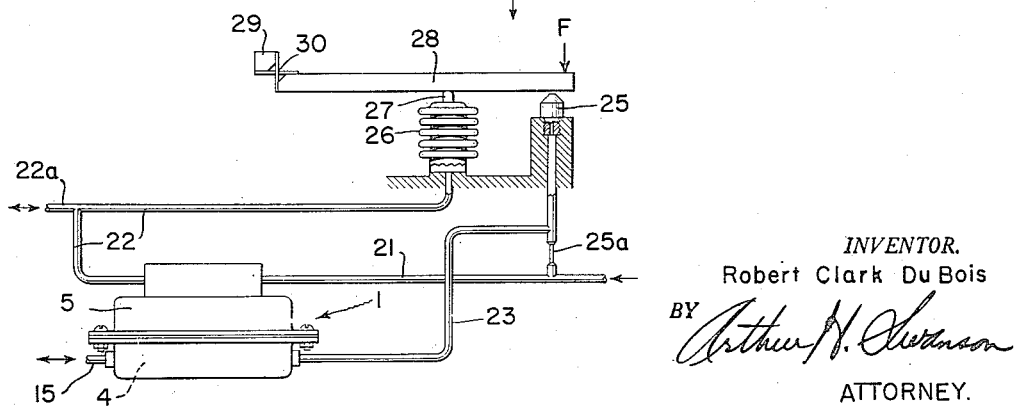
Fig. 3 is a diagrammatic showing of a portion of a control system including the pilot valve shown in Fig. 1.

By way of example, I have illustrated the use of the pilot valve 1 in a control system shown in Fig. 3, in which the bleed nozzle 25 is connected by a pipe 23 to the control pressure chamber 4, and is connected through a restricted orifice 25a to the air supply pipe 21. In Fig. 3, the feedback pipe 22 is connected to the fixed end of the control chamber 26 which has its movable end 27 in engagement with a lever 28. The latter has one end connected to a supporting structure 29 by cross strip pivot springs 30. The lever 28 operates in conjunction with the bleed nozzle 25 as a flapper valve variably throttling the bleed nozzle 25 as required to minimize pressure variations in the chamber 4 and thereby in the chamber 3. Because of this throttling arrangement a change in the magnitude of the input force "F" applied to the lever 28 will cause the control pressure being transmitted by pipe 23 to the control pressure chamber 4 to be changed. As the force F is gradually increased the pressure in chamber 4 will also be increased and if this force F is decreased a corresponding decrease in the control pressure chamber 4 will likewise take place.

Upon the occurrence of an increase in the aforementioned force in Fig. 3 the beam 28 will move to a position that is closer to the nozzle 25. This action will cause the level of the fluid pressure in the portion of the conduit 23 that is above the restriction 25a to increase. This increase in fluid pressure will, in turn, be transmitted by conduit 23 to the control pressure chamber 4. If it is assumed that the feedback and transmitting pressure in chamber 3 and the input pressure in chamber 4 has positioned the diaphragm in the position shown in Fig. 1 before this increase in pressure takes place, the increase in control pressure applied to the chamber 4 will then cause the diaphragm 11 and its rigid central portion 10 to be moved in an upward direction. As this movement occurs the valve 17 will also be moved in an upward direction by the portion 10 against the downward bias of the spring 20. This action will permit air at a predetermined constant supply pressure, being transmitted by the conduit 21, to flow from a supply chamber 2 through the port 16 into the feedback and transmitting chamber 3. If the level of the pressure in the chamber 3 is of a lower value than the level of the aforementioned regulated supply pressure that is permitted to flow into this chamber 3 through the port 16 the pressure of the fluid in chamber 3 will be then increased by an amount that is equal to the level of the pressure in the nozzle 25 or is directly proportional to the increase in the force F that was applied to move the beam 28 closer to the nozzle 25. This increase in fluid pressure level will then be transmitted by way of the conduit 22 to the interior of the feedback bellows chamber 26 so that a force, acting in the opposite direction to the force F, may be applied to rebalance the beam 28. This action will cause the beam 28 to move in a direction away from the nozzle and a greater amount of fluid in the chamber 4 to be bled through the conduit 23 and nozzle 25 to the atmosphere surrounding the casing 1. This fluid bleeding action will tend to cause the level of the pressure of the fluid in chamber 4 to drop, the valve 17 to close the port 16 and the rigid central portion 10 of the diaphragm 11 to move slightly in a downward direction from the position shown in Fig. 1. The level of the fluid pressure in chamber 3 will then be lowered due to the fact that there is now a bleed to atmosphere from this chamber between the lower portion 19 of the valve 17 and port 12 through the exhaust tube 14, 13, 15. As the lowering of the level of this pressure continues, a point will be reached where the level of the pressure in chamber 3 will start to drop below the level of the pressure in the chamber 4. As this condition occurs the fluid pressure acting on the diaphragm 11 in the chamber 4 will then be permitted to move the diaphragm in an upward direction so that the exhaust port 12 connected to the atmospheric exhaust tube 13, 14, 15 will be closed by the valve 19. If the lowering of the level of the fluid pressure in the chamber 3 continues then the valve 17 will be caused to move in an upward direction from the seated position shown in Fig. 1 in a manner similar to that previously described.

It can thus be seen that as the input force F moves the beam towards the nozzle this force will simultaneously be opposed by a force created by the feedback and transmitting pressure in chamber 3, conduit 22 and bellows 26 to oppose the force F.

By selecting a proper size spring for the compression spring 20, shown in Fig. 1, it is possible to govern the threshold pressure at which the valve 17 will open port 16. This threshold pressure is the pressure which must be present in the chamber 4 in order to move the valve 17 in an upward direction from the seated position shown in Fig. 1 of the drawing.

The size of the enclosed areas of the chambers 3 and 4 may be so proportioned as to provide a still more rapid means of transmitting changes in nozzle pressure through the relay valve and conduit 22A to a control element such as the head of a control valve in a flow line, not shown. It should also further be noted that the tapered valve 17 is biased by the spring 20 to close the diaphragm end 14 of the exhaust tube 13 when the upper portion 18 of the valve 17 is still permitting even a small predetermined fluid supply pressure to flow through the port 16.

It can thus be seen that the relay 1 will thus provide a means for speeding up the response time that is normally required by a bleed nozzle chamber and feedback bellows connected therewith to transmit a change in nozzle pressure to the head of a control element such as a control valve in the flow line, not shown.

The pilot valve 1 shown in Figs. 1 and 3 is characterized by its use of a single diaphragm to serve control purposes heretofore served by a pilot valve structure having two associated diaphragms, as is shown for example, in the previously mentioned prior Patents 2,125,081 and 2,618,286. The use of a single diaphragm in a pilot valve to serve operating purposes heretofore requiring the use of two pilot valve diaphragms, is made possible by applicant's use of the tube 13 as a flexible exhaust tube regulating the pressure in the chamber 3.

Figure 2:
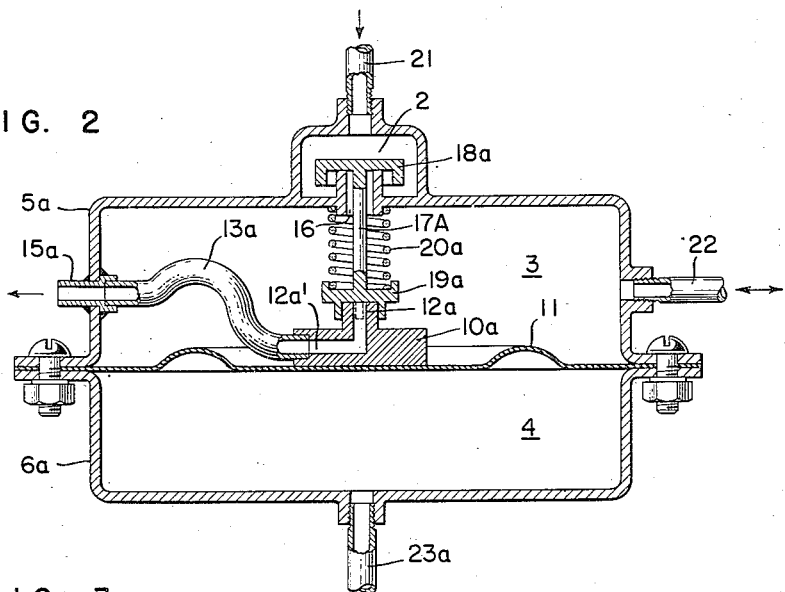
Fig. 2 is a sectional elevation of a modified form of pilot valve.

Fig. 2 illustrates an embodiment of the invention shown in Fig. 1, which differs structurally from the apparatus shown in Fig. 1 in that it comprises elements 5a, 10a, 12a, 13a, 15a, 17A, 18a, 19a and 20a which are generally like, but differ somewhat from the previously mentioned elements 5, 10, 12, 13, 15, 17, 18, 19 and 20. The differences just referred to are relatively unimportant from the operating viewpoint. It is to be noted, however, that in Fig. 2, the pipe 13a is located in the chamber 3 instead of in the chamber 4 as shown in Fig. 1. In Fig. 2, the exhaust port 12a is formed wholly within the central diaphragm portion 10a, and comprises an upper portion coaxial with the casing structure, and a lower portion 12a' transverse to the portion 12a. The tube 13a in Fig. 2 is shown as having one end anchored in the diaphragm portion 10a with its bore in register with the discharge end of the passage portion 12a'. The discharge end portion of the exhaust pipe 13a extends through and is anchored in the cylindrical portion 5 of the upper casing section of the pilot valve shown in Fig. 2. As will be apparent, the pilot valve shown in Fig. 2 may either be incorporated in a pneumatic balance system of the type shown in Fig. 3 or as a substitute for the double diaphragm type of reverse acting relay shown in the previously mentioned Johnson Patent 2,618,286.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. A pilot valve structure comprising in combination, a casing enclosing separate first and second pressure chambers, a flexible diaphragm interposed between and separating said chambers, means including a port opening into said first chamber for supplying fluid under pressure to that chamber when said port is open, a pressure transmitting conduit having one end in communication with said first chamber, an exhaust conduit having its inlet end opening into said first chamber and having its outlet end opening into the space external to said chamber, valve means controlling the flow of fluid under pressure through said port into said first chamber and the outflow of fluid through said exhaust conduit, said valve means operating automatically to close said port and said inlet end of said exhaust conduit when said diaphragm occupies an intermediate position and automatically opening said port when said diaphragm is displaced toward said port from said intermediate position and automatically opening said exhaust inlet when said diaphragm is displaced away from said port and intermediate position, and a connection to said second chamber operative to transmit a control pressure from a remotely located control apparatus to said second chamber.

2. A pilot valve as specified in claim 1, in which said exhaust conduit is formed of flexible, non-elastic material.

3. A pilot valve structure as specified in claim 1, in which said exhaust conduit extends through said diaphragm and thence through a stationary portion of the wall of said second pressure chamber.

4. A pilot valve structure comprising in combination, a casing enclosing separate first and second pressure chambers, a flexible diaphragm interposed between and separating said chambers, means including a port opening into said first chamber for supplying fluid under pressure to that chamber when said port is open, a pressure transmitting conduit having one end in communication with said first chamber, a flexible exhaust conduit having its inlet end extending into said first chamber and having its outlet end opening into the space external of said chamber, valve means controlling the flow of fluid under pressure through said port into said first chamber and the outflow of fluid through said exhaust conduit, said valve means operating automatically to decrease the flow from said port and increase the flow through said exhaust conduit when said diaphragm is displaced in a first direction, and to increase the flow through said port and decrease the flow through said exhaust when said diaphragm is displaced in the opposite direction, and a connection to said second chamber operative to transmit a control pressure from control apparatus to said second chamber.

5. A single diaphragm valve actuating relay to transmit a pressure from a casing which varies in accordance with the magnitude of a control pressure comprising, a rigid and a flexible partition within said casing, a supply port in said rigid partition and an exhaust port attached to said flexible partition, a tapered double acting valve having a supply and exhaust port engaging portion for regulating the flow of a supply pressure into and out of the portion between said partitions, a biasing means acting on said valve portions to urge said portions in a direction to close the supply port and exhaust port in said flexible partition, a flexible atmospheric exhaust tube connected at one end to said exhaust port and having its other end connected to an opening in the wall of said casing, means for supplying a control pressure of varying magnitude acting on the face of said flexible partition on the side opposite said rigid partition, said flexible partition acting on said valve to open said supply port upon increase in the magnitude of said control pressure beyond a predetermined amount and said biasing means acting on said valve to restore said valve to its partially open position as the magnitude of said control pressure returns to said predetermined amount, said flexible partition also acting on the valve to close said supply port and open said exhaust port when said control pressure drops below said predetermined amount and acting to reverse this latter action as the control pressure returns to said predetermined amount.

6. A single diaphragm valve actuating relay to transmit a pressure which varies in accordance with the magnitude of a control pressure comprising, a rigid and a flexible partition within a casing, a supply port in said rigid partition and an exhaust port attached to said latter mentioned part of said partition, a tapered double acting valve having a supply and exhaust port engaging portion, a biasing means acting on said valve portions during normal operating conditions to close the exhaust port in said flexible partition when said supply port is in a partially open position, a flexible atmospheric exhaust tube connected to said exhaust port, means for creating a variable control pressure acting on one side of said flexible partition, said flexible partition acting on said valve to further open said supply port upon increase in said variable control pressure beyond a predetermined amount and acting to restore the valve to its partially open position as the said variable control pressure returns to said predetermined amount, said flexible partition acting on the valve to close said supply port and open said exhaust port when said variable control pressure drops below the predetermined amount and acting to reverse this latter action as the variable control pressure returns to said predetermined amount, and a conduit connected to said casing portion between said two partitions for transmitting said pressure between said partitions from said chamber.

7. A pilot relay for producing an outlet pressure which follows an input control pressure by regulating a supply pressure fluid flowing into and an exhaust pressure from a chamber, a conduit for transmitting said outlet pressure, the improvement comprising a flexible member fixedly attached at its periphery to the wall of said chamber and having an aperture in its central portion, a flexible exhaust tube having the outer peripheral portion of one of its ends inserted in and attached to said central portion and having its other end exhausted to atmospheric pressure, a portion of a double acting tapered valve in said chamber biased by a spring means during normal operating conditions to close said diaphragm end of said exhaust tube when a second portion of said valve controlling the said supply pressure flowing into said chamber is in a partially open position, said input control pressure acting on said flexible member, said flexible member acting on said valve to regulate the degree of movement of said valve with respect to said control pressure, said control pressure tending to further open said supply port when said diaphragm is moved toward the valve and tending to close said supply port and open said exhaust tube port when said diaphragm moves in the opposite direction.

8. A pilot valve structure comprising in combination, a casing enclosing separate first and second pressure chambers, a flexible diaphragm interposed between and separating said chambers, means including a port opening into said first chamber for supplying fluid under pressure to that chamber when said port is open, a pressure transmitting conduit having one end in communication with said first chamber, a flexible exhaust conduit contained within said first chamber and having its outlet end communicating through an opening into the space external of said chamber, valve means controlling the flow of fluid under pressure through said port, into said first chamber, and the outflow of fluid through said exhaust conduit, said valve means operating automatically to decrease the flow from said port and increase the flow through said exhaust conduit when said diaphragm is displaced in one direction, and to increase the flow through said port and decrease the flow through said exhaust when said diaphragm is displaced in the opposite direction, and connection to said second chamber operative to transmit a control pressure from a control apparatus to said second chamber.

References Cited in the file of this patent

UNITED STATES PATENTS

| | | |
|---|---|---|
| 2,332,627 | Erbguth | Oct. 26, 1943 |
| 2,517,051 | Swenson | Aug. 1, 1950 |
| 2,587,404 | Stelzer | Feb. 26, 1952 |
| 2,618,286 | Johnson | Nov. 18, 1952 |